Oct. 29, 1940.   H. ERDMANN ET AL   2,219,544
DEVICE FOR FILLING AMPOULES AND THE LIKE
Filed Aug. 19, 1938   2 Sheets-Sheet 1
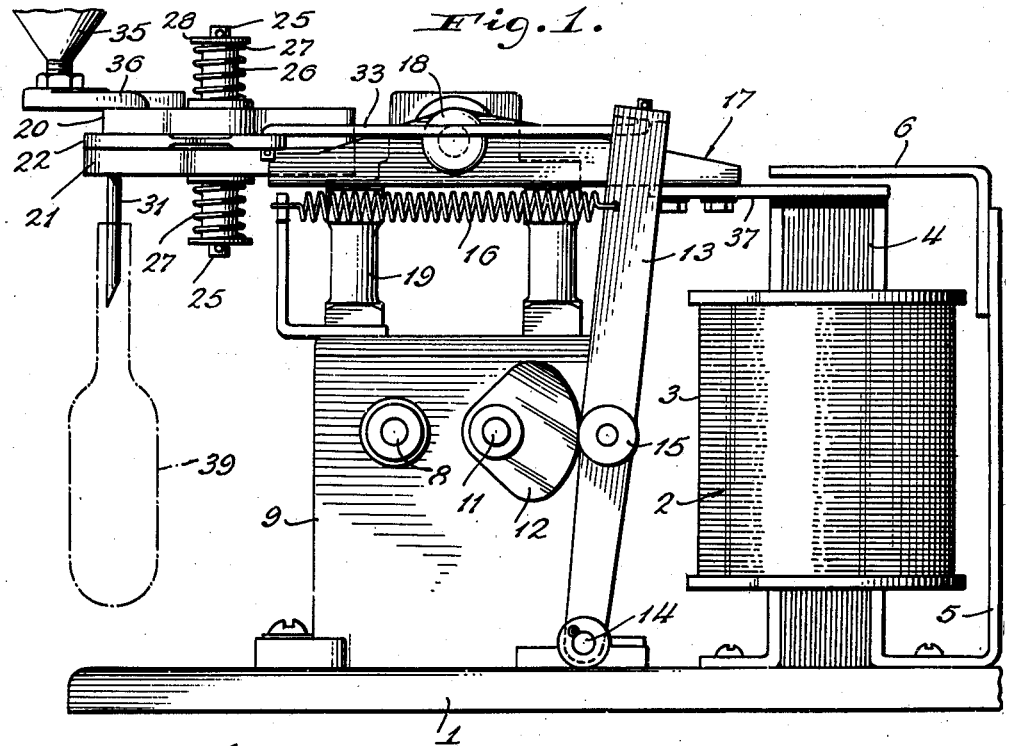
Fig. 1.
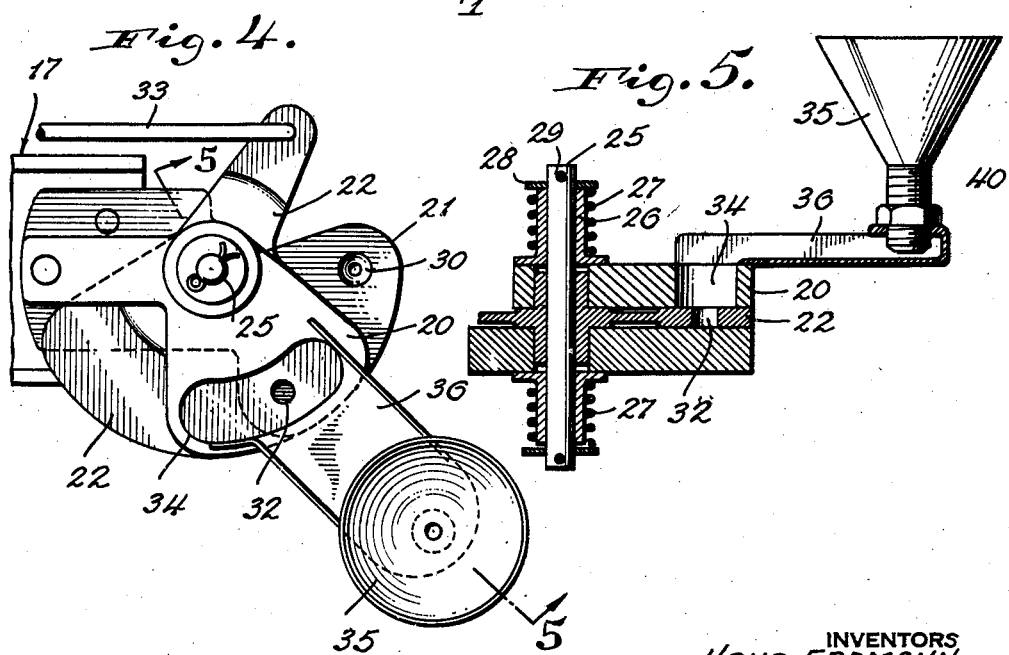
Fig. 4.
Fig. 5.
INVENTORS
HANS ERDMANN
WALTER VOETTER
BY
ATTORNEYS

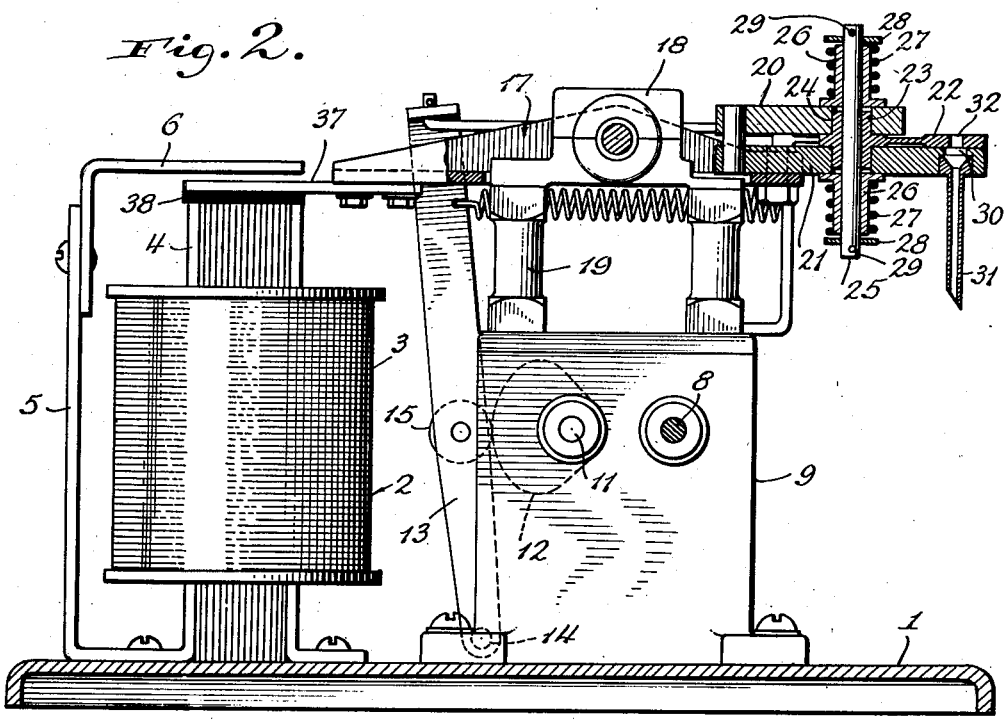
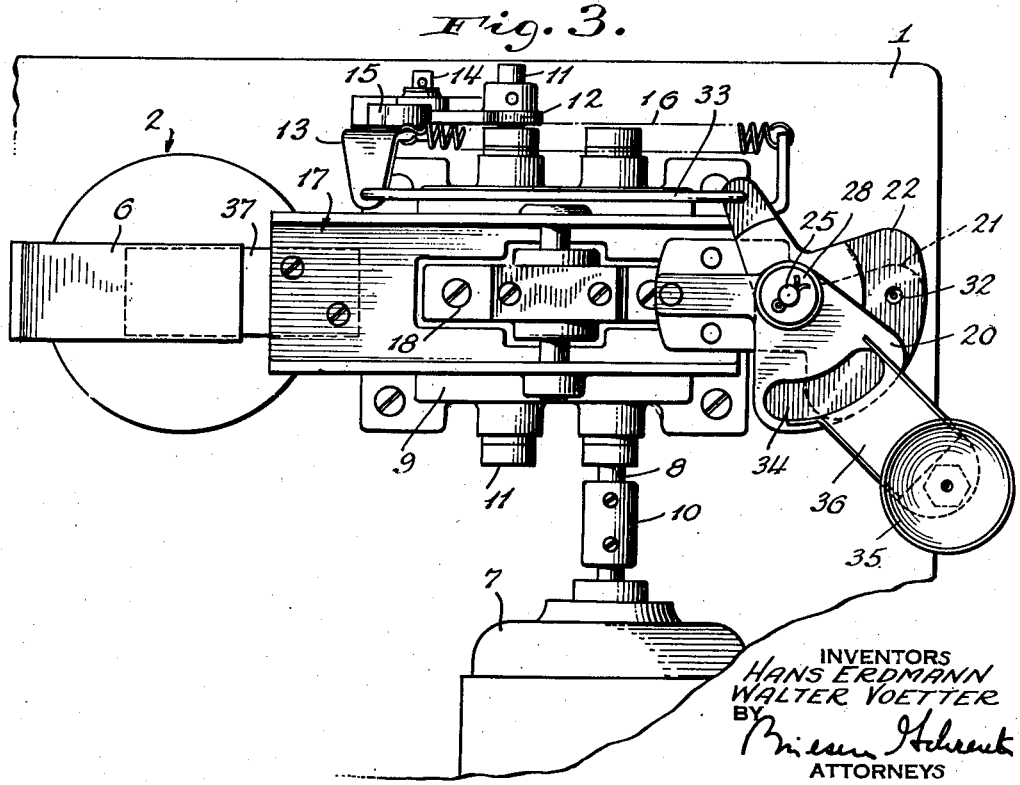

claim 2, in which the device with which the slide is adapted to communicate comprises a long needle having a bore therethrough and which needle is of such a length as to be adapted to enter a considerable distance into the neck of the ampoule, said needle partaking of the vibration set up by said ampoule-creating device and moving upwardly and downwardly with said support but having no substantial movement in lateral directions.

HANS ERDMANN.
WALTER VOETTER.

Patented Oct. 29, 1940

2,219,544

UNITED STATES PATENT OFFICE 2,219,544

DEVICE FOR FILLING AMPOULES AND THE LIKE

Hans Erdmann, Montclair, and Walter Voetter, West Orange, N. J., assignors to Schering Corporation, Bloomfield, N. J., a corporation of New Jersey Application August 19, 1938, Serial No. 225,670

4 Claims. (Cl. 226—72)

This invention relates to a device for measuring and depositing medicinal preparations in a powdered or crystalline form into ampoules, or the like, in measured doses.

Pharmaceutical manufacturers put up preparations which are distributed to the physician in powdered or crystalline form sealed in glass ampoules. The capacity of the ampoule is many times the volume of the amount of medicinal preparation inasmuch as the medicinal preparation, before injection into the patient, must be dissolved or suspended in distilled water or other solution. The physician in the course of mixing the medicinal preparation and the liquid, breaks off the top of the ampoule containing the medicinal preparation and likewise breaks off the top of another ampoule containing the liquid. The liquid is then poured into the ampoule containing the medicinal preparation to prepare the material for injection. The mixed materials are then taken up with a hypodermic needle while in the ampoule, which originally contained the medicinal preparation, and then injected. The amount of the medicinal preparation represents a standard dose and the device of this invention measures the quantity of the dose and deposits the same into an ampoule. The ampoule is a fragile and small, long-necked container and it is important that the ampoule be not cracked in the course of depositing the medicinal preparation therein. It is also of importance that the dose be measured with some exactness to conform to the standard dosage for the particular medicinal preparation being put up. Such medicinal preparations are put out and used in small dosages, the weight of each dosage in many instances being 0.1 of a gram and sometimes less.

It has been found to be somewhat difficult to handle these small quantities of materials, particularly measuring the same and inserting the measured quantity through the small, slender mouth and neck of an ampoule. In fact, as far as we are aware, such quantities have heretofore been measured by the use of an apothecary's scale and introduced into the ampoule by attempting to pour the same into the open end thereof.

This invention provides a device by which a measured quantity of medicinal preparations can be selected and readily introduced into an ampoule in a definite measured quantity under sanitary conditions.

In the drawings, Fig. 1 is a side view of the device; Fig. 2 is an opposite side view partly in section; Fig. 3 is a plan view of Fig. 2; Fig. 4 is an enlarged plan view of a portion of the device shown in Fig. 3 at the righthand side thereof; Fig. 5 is a section on the line 5—5 of Fig. 4.

The base 1 carries an electrical device 2 capable, when electrically actuated, of setting up vibrations, preferably at the rate of sixty impulses a second, which can readily be obtained if the instrument is connected with a line delivering a hundred and ten volts A. C. A magnetic coil 3 associated with a core 4 has been found to be satisfactory for delivering the required vibrations or impulses. The U-shaped strip 5 secured to the base 1 has a laterally extending arm 6 which extends over the core 4 in spaced relation thereto.

The vibrating or impulse-producing device is connected by a suitable line to a source of alternating current (not shown). The shaft of the electric motor 7 is secured to the shaft 8 of the speed reducer 9 by a collar 10. The parallel driven shaft 11 carries the cam 12. An arm 13, pivoted at 14 to the base 1, carries a roller 15 which is engaged periodically by the cam 12 in the course of its cycle. The arm 13 is drawn under tension of the spring 16 toward the face of the cam 12 in order that the roller 15 shall at all times engage the face of the cam 12 and reciprocate under the impulse of the varying high and low points of the cam. A support 17 is journalled in the bearing block 18 secured to the posts 19 mounted on the top of the speed reducer. The support 17 at one end thereof carries upper and lower plates 20 and 21 which are spaced apart to accommodate a slide 22 interposed between them. The slide 22 is provided with a hub 23 which fits into recesses 24 in the plates 20 and 21. A shaft 25 passes through the recesses 24 and fits securely in the bearing 23 and is supported by the bearings 26, secured to the plates 20—21. The coil springs 27, retained under pressure by the plates 28 and pins 29, unite the top and bottom plates 20 and 21 and the slide 22 resiliently and thus provide for movement of the slide 22 with the shaft 25 in the bearing 26. The lower plate 21 extends beyond the outer edge of the plate 20 and is provided with a recess 30 connecting with an elongated hollow needle 31. The slide 22 is provided with a measuring cup 32 opened at both ends, the lower opening whereof is closed by the top surface of the plate 21 whenever the slide is in a position other than in alignment with the needle 31. The measuring cup 32 is of such capacity as to contain, when filled, a given amount of the medicinal preparation to provide a single dose or a measured quantity for each ampoule.